United States Patent
Guillerme et al.

(10) Patent No.: US 6,945,537 B2
(45) Date of Patent: Sep. 20, 2005

(54) SEALING RING

(75) Inventors: Celine Guillerme, Neuilly L'eveque (FR); Eric Kammerer, Langres (FR)

(73) Assignee: Carl Freudenberg KG, Weinheim (DE)

(*) Notice: Subject to any disclaimer, the term of this patent is extended or adjusted under 35 U.S.C. 154(b) by 0 days.

(21) Appl. No.: 10/797,674

(22) Filed: Mar. 10, 2004

(65) Prior Publication Data

US 2004/0188950 A1 Sep. 30, 2004

(30) Foreign Application Priority Data

Mar. 27, 2003 (DE) .......................... 103 13 958

(51) Int. Cl.[7] .............................................. F16J 15/32
(52) U.S. Cl. ..................... 277/559; 277/549; 277/560; 277/561; 277/562
(58) Field of Search ................. 277/549, 559, 277/560, 561, 562

(56) References Cited

U.S. PATENT DOCUMENTS

| | | | | |
|---|---|---|---|---|
| 6,401,322 B1 | * | 6/2002 | Matsushima | 29/460 |
| 6,428,013 B1 | * | 8/2002 | Johnston et al. | 277/400 |
| 6,520,507 B2 | * | 2/2003 | Pataille et al. | 277/561 |
| 6,764,080 B2 | * | 7/2004 | Hosokawa et al. | 277/564 |
| 2002/0158421 A1 | | 10/2002 | Johnston | |

FOREIGN PATENT DOCUMENTS

EP    1 024 318 A2    2/2000

\* cited by examiner

*Primary Examiner*—Enoch E Peavey
(74) *Attorney, Agent, or Firm*—Harness, Dickey & Pierce P.L.C.

(57) ABSTRACT

A sealing ring comprising a bearing ring with a radial flange and a sealing sleeve, which at its free end is connected to a thickened, surrounding bulge.

20 Claims, 4 Drawing Sheets

SEALING RING

CROSS-REFERENCE TO RELATED APPLICATIONS

This application claims the benefit of German Patent Application 10313958.3, filed Mar. 27, 2003. The disclosure of the above application is incorporated herein by reference.

FIELD OF THE INVENTION

The present invention relates to a sealing ring.

BACKGROUND OF THE INVENTION

Sealing rings are known, for example, from DE 100 33 446 A1. In DE 100 33 446 A1, the sealing ring comprises a bearing ring consisting of an axial flange and a radial flange, as well as a sealing sleeve that is fastened to the bearing ring. To seal off the housing, a sealing region consisting of an elastomeric material is vulcanized onto the axial flange of the bearing ring. In the sealing sleeve is provided, on the side facing the shaft, at least one back-feeding groove for feeding back the medium to be sealed in the direction of the space to be sealed off. The sealing sleeve consists of an elastomeric material and has essentially the same structure from the region in which it is connected to the bearing ring to its free end. The free end presses against the surface to be sealed of the machine element to be sealed exclusively by the elastic pressing force of the elastomeric material. The service life of the sealing sleeve is prolonged by providing such a small pressing force.

SUMMARY OF THE INVENTION

The object of the invention is to further develop a sealing ring with a sealing sleeve of the above-described kind in a manner such that the sealing sleeve, regardless of the direction in which its free end is curved, contacts, with an increased pressing force, the surface of the machine element to be sealed. Another object is that the sealing ring be produced in a simple and economic manner. The risk of faulty installation is thereby minimized.

To reach the above objective, the sealing sleeve is connected at its free end with a thickened bulge surrounding it. The bulge of the invention increases, at the free end of the sealing sleeve, the radial pressure against the shaft to be sealed, and prevents the medium to be sealed from leaking, particularly when the free end of the sealing sleeve is curved in the direction of the surroundings and pressure is applied to the space to be sealed off. Even then, the bulge prevents the sealing sleeve from lifting off the surface to be sealed. The bulge is designed so that the constructively provided sealing region of the sealing sleeve adheres to the shaft under all permissible operating conditions. Because of its simple design, the sealing ring is readily installed and a coiled spring for the ring is not needed.

The bulge preferably consists of an elastomeric material. These materials, because of their rubber elasticity, exert a radial pressing force on the shaft to be sealed.

It is advantageous to fasten the sealing sleeve to the radial flange of the bearing ring by means of an intermediate elastomeric layer. The intermediate elastomeric layer also allows sealing sleeves made of a porous material to be readily attached to the bearing ring.

In an advantageous embodiment, the sealing sleeve is provided with a flat covering on its side facing away from the shaft to be sealed. The sealing sleeve can be fastened to the intermediate layer and the covering. Such a design is advantageous when, in particular, the sealing sleeve is made of a self-lubricating material such as polytetrafluoroethylene [PTFE] which does not adhere well. The covering is so thin that its effect on the radial pressure of the sealing ring is negligible, because in order to ensure optimal pressure by the sealing region, the radial pressure should be exerted primarily by the bulge.

In another embodiment, the covering can be provided with ribs distributed over the periphery. The ribs increase the surface of the covering on the side of the sealing sleeve facing away from the shaft thus improving the removal of the heat of friction.

In a further advantageous embodiment, the covering can be impervious to diffusion. This is particularly advantageous when the sealing sleeve consists of a porous material and is very thin. In this case, the sealing sleeve can, on the side facing away from the shaft, be provided with a diffusion-resistant covering thus preventing diffusion through the sealing sleeve.

Advantageously, the bulge and the covering consist of a single unit, and are made of the same material. When the bulge and the covering are made as a single unit, the ribs of the covering facilitate the fabrication of the bulge because the ribs increase the cross-section which is used as flow cross-section in making the bulge. Constructing the bulge and the covering as a single unit allows the bulge to be secured on the bearing ring.

Preferably, the bulge is connected with the sealing sleeve by adhesion. By the adhesive connection, the radial pressing force exerted by the bulge is transferred to the free end of the sealing sleeve. In this manner, the sealing region of the sealing sleeve presses against the shaft to be sealed with a pressing force defined by the bulge.

The preferred dimensional ratios of the bulge are a ratio of bulge height to covering thickness of at least 4 and/or a ratio of bulge height to bulge width from 0.5 to 5. With such dimensional ratios, it is possible to achieve the pressing force required for all applications, while at the same time keeping material requirements low.

In an advantageous embodiment, the bulge is provided, at its side facing the shaft, with at least one lip-shaped projection extending radially inward. The lip is closed in itself and surrounds the shaft in a sealing manner. Such a projection, unlike a flat one, reduces the friction of the bulge by line pressure.

Preferably, the sealing sleeve is provided, on its side facing the shaft, with at least one back-feeding groove to convey the medium to be sealed in the direction of the of the space to sealed off. The back-feeding groove improves the dynamic tightness of the sealing ring, and the sealing sleeve is always adequately lubricated. The lubricant consists of the medium to be sealed and is constantly renewed by the back-feeding effect.

In an advantageous embodiment, the back-feeding groove can be closed off at the free end of the sealing sleeve by a closed circular design of the bulge projection. When the shaft to be sealed is at a standstill, the closed design of the projection prevents leaking of the medium to be sealed. As a rule, the depth, cross-section, and slope of the back-feeding groove along the sealing sleeve are constant. It is also possible, however, for the depth, slope and/or width of the back-feeding groove to be variable over the course of the sealing sleeve.

The bearing ring is preferably provided with an axial flange which, on the side radially facing away from the shaft, is connected with the radial flange. The axial flange is surrounded on the peripheral side by a static sealing region. The static sealing region secures the sealing of the sealing ring toward the housing.

In an advantageous embodiment, the covering and the static sealing region are made of an elastomeric material. By their rubber-elastic behavior, elastomeric materials allow the equalization of manufacturing tolerances so that, for example, the housing and/or the bearing ring of the sealing ring can be made more economically.

The covering, the static sealing region, and the bulge are preferably made as a single unit and of the same material. In this manner, these parts can be fabricated in a single step thus eliminating the possibility of faulty assembly.

In another embodiment, the covering and the bulge are made of a material different from that constituting the static sealing region. In this manner, it is possible to choose materials that are optimized for special operating requirements. The covering is preferably flat, but it can also be corrugated.

The sealing sleeve preferably consists of a PTFE compound. The sealing sleeve is thus resistant to most media that have to be sealed. Moreover, PTFE materials have good heat stability, good sliding properties, and excellent resistance to seizing. A sealing sleeve made of PTFE is nearly wear-free.

In a further embodiment, the sealing sleeve can be curved in the direction of the surroundings. Such a design permits simple installation of the sealing ring without the use of an installation device. The bulge allows this type of installation also at higher media pressures.

In another embodiment, the sealing sleeve can be curved in the direction of the space to be sealed off. This type of installation permits higher pressures from the side of the medium than when the sealing sleeve is oriented in the direction of the surroundings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
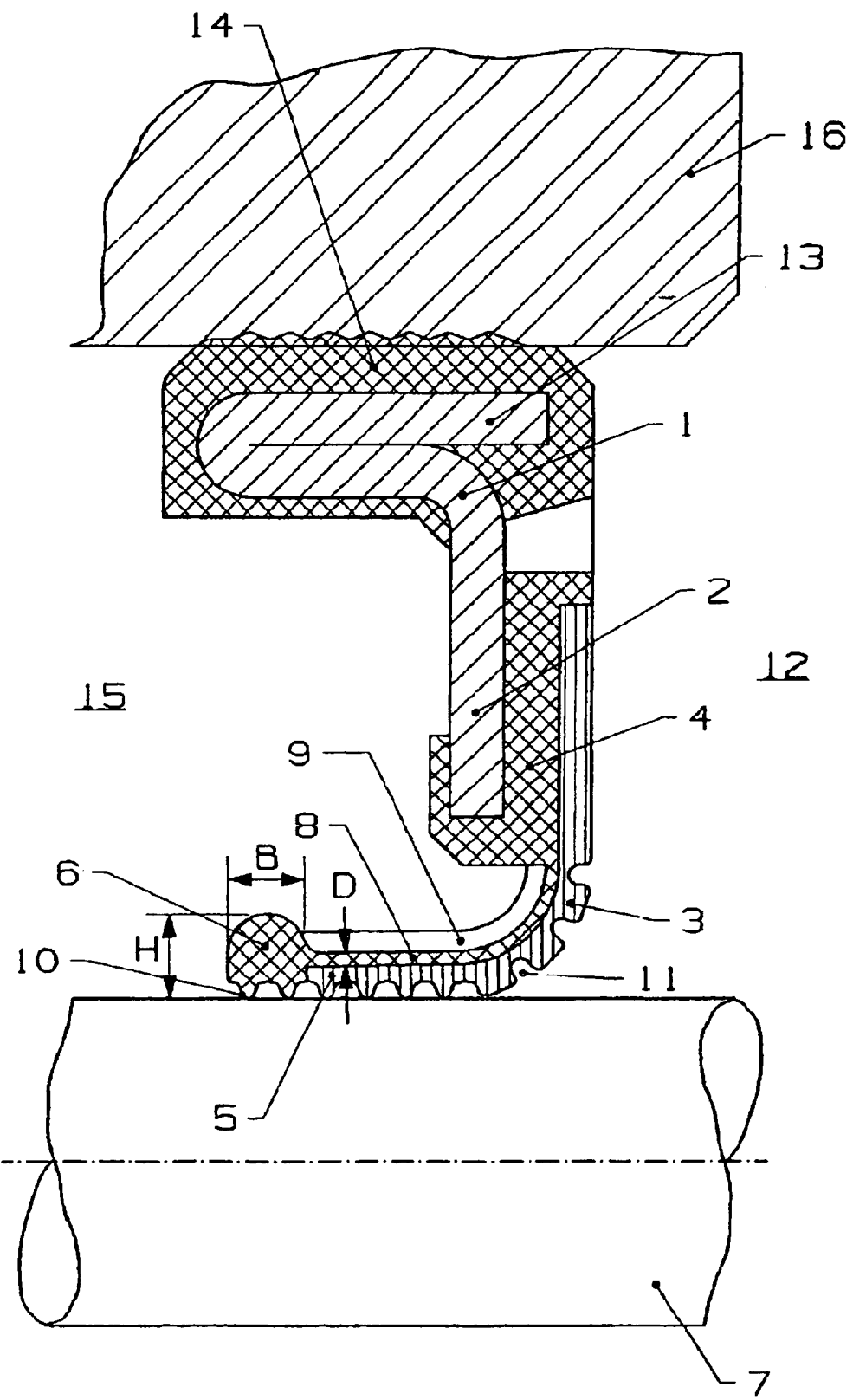
FIG. 1 shows an embodiment of the sealing ring according to principles of the invention in a longitudinal cross-sectional view.

FIG. 1 shows a sealing ring comprising a metallic bearing ring 1, with an axial flange 13 and a radial flange 2. A sealing sleeve 3, on the free end of which is adhesively fastened a bulge 6, extends along the periphery of the bearing ring 1. The sealing sleeve 3, which in this embodiment consists of PTFE, is fastened to the bearing ring 1 with the aid of an intermediate layer 4. Sealing sleeve 3 is curved in the direction of the surroundings 15. On the side of sealing sleeve 3 that faces a shaft 7 to be sealed, is located a back-feeding groove 11. The back-feeding groove 11 is of a known design in regards to its slope, cross-section and ratio numbers. On the side of sealing sleeve 3 facing away from shaft 7 is connected, with the sleeve, a flat, peripherally extending covering 8 made of an elastomeric material with ribs 9 uniformly distributed over its periphery. At the free end of sealing sleeve 3, the covering 8 merges with a thickened bulge 6 extending over the periphery. Bulge 6 and covering 8 are made of the same material and as a unit. The ratio of height H of bulge 6 to the thickness D of covering 8 amounts to 10, and the ratio of height H to the width B of bulge 6 amounts to 2.5. The side of bulge 6 facing shaft 7 is provided with at least one concentrically surrounding projection 10 which by a peripherally circular, closed design closes off back-feeding groove 11 of sealing sleeve 3.

To seal the sealing ring in housing 16, a static sealing region 14 consisting of a layer of elastomeric material is vulcanized onto axial flange 13 of bearing ring 1. Static sealing region 14, covering 8 and bulge 6 preferably constitute a single unit made of the same material.

Figure 2:
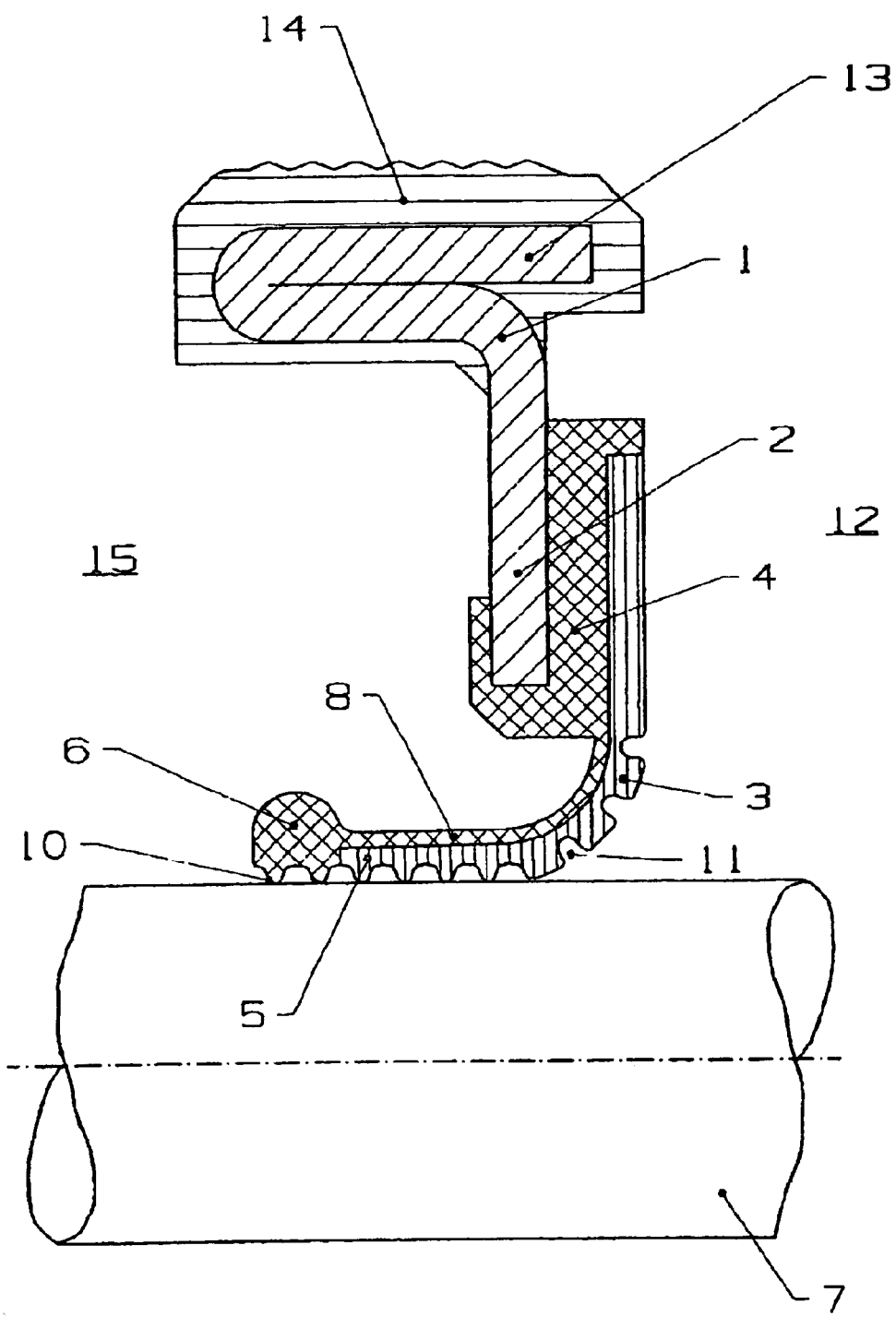
FIG. 2 is an embodiment of the sealing ring according to the principles of the invention wherein the covering and the bulge are made of a material different from that constituting the static sealing region.

FIG. 2 shows a further embodiment of the sealing ring. In this embodiment, the elastomeric material for bulge 6 and covering 8 is different from the elastomeric material for static sealing region 14.

Figure 3:
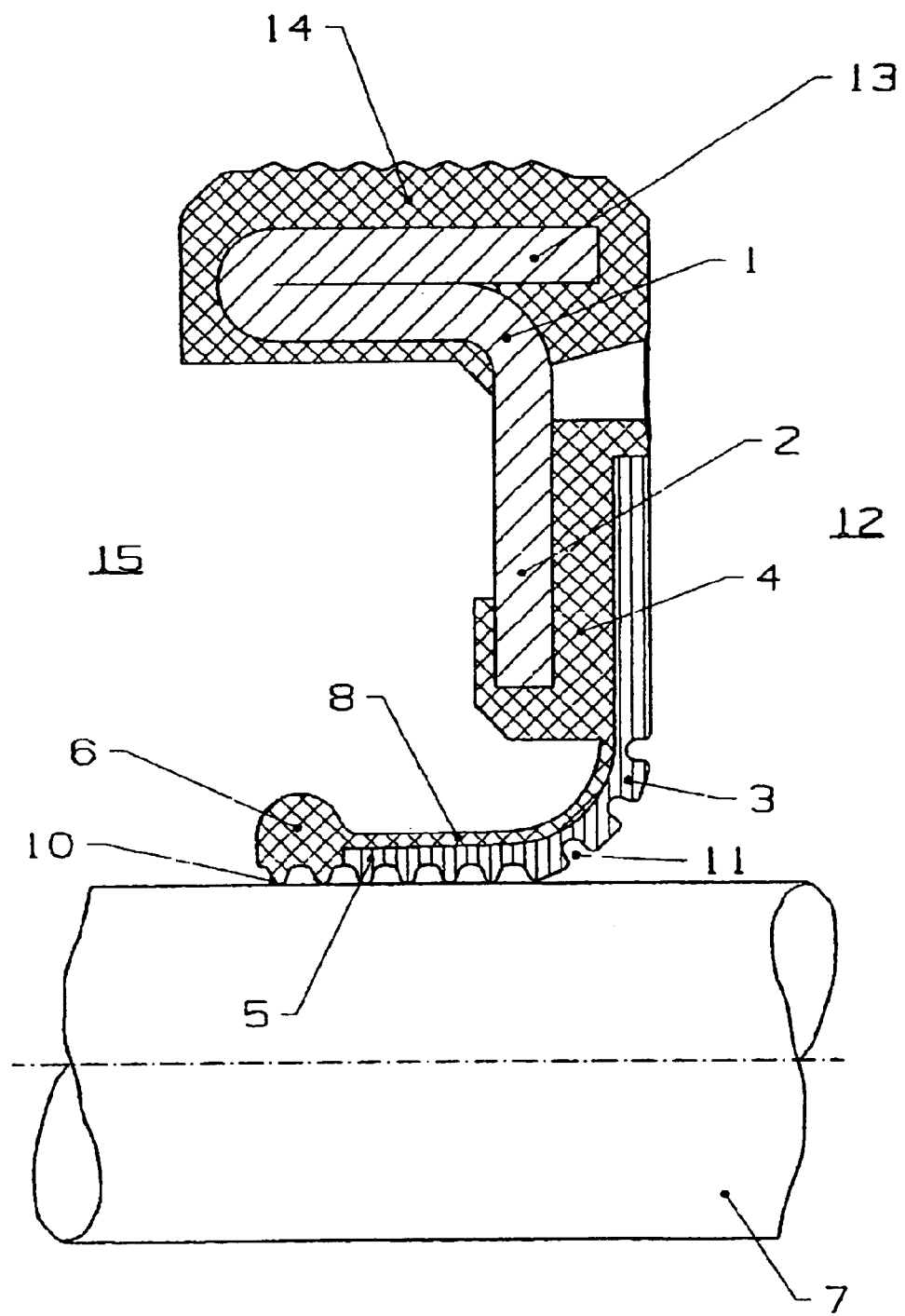
FIG. 3 shows an embodiment of the sealing ring according to the principles of the invention with no ribs distributed over the periphery.

FIG. 3 shows an embodiment of the sealing ring wherein covering 8 has no ribs.

Figure 4:
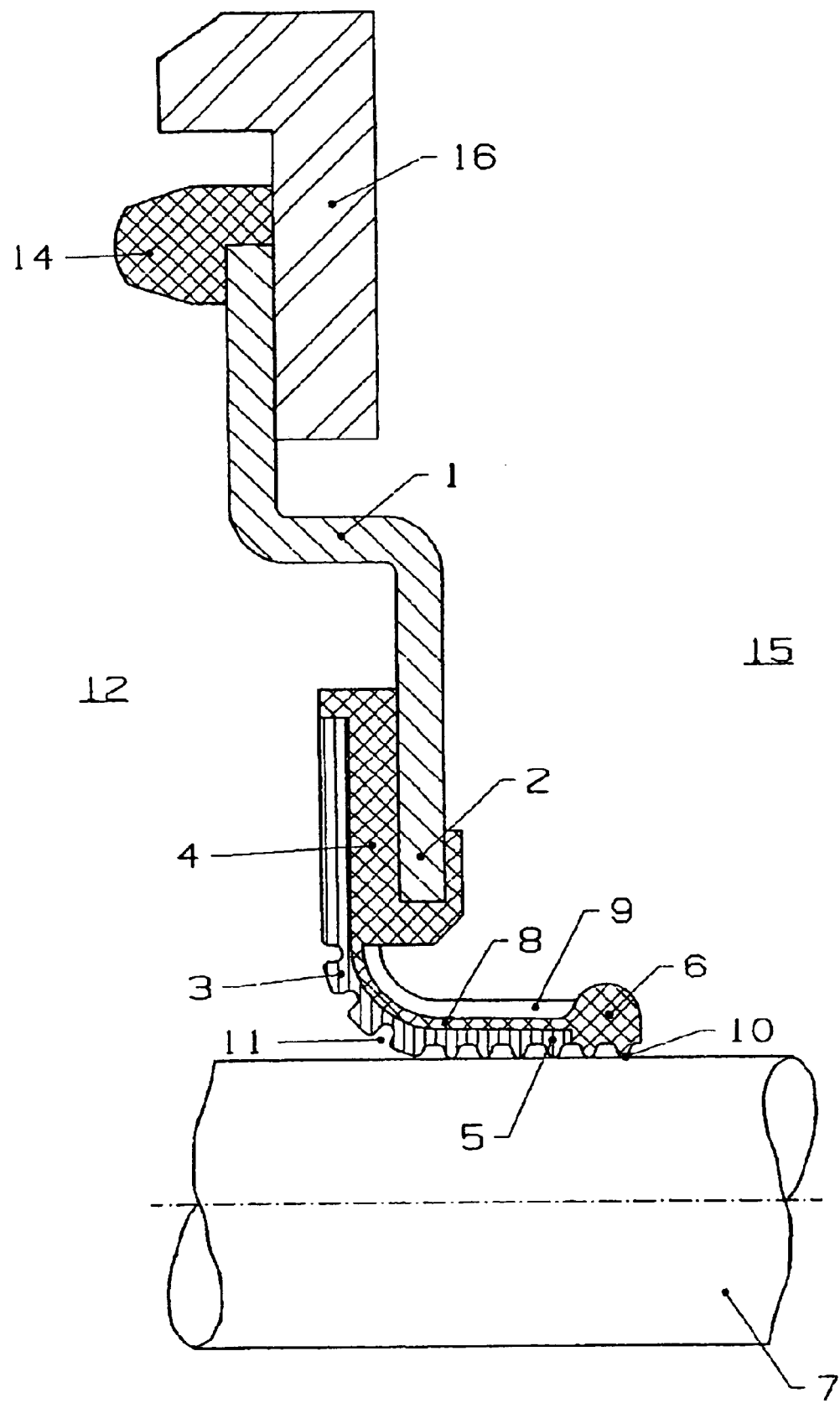
FIG. 4 shows an embodiment of the sealing ring according to the principles of the invention designed without an axial flange and with a housing lid.

FIG. 4 shows schematically an embodiment of the sealing ring of FIG. 1 with a modified bearing ring 1, devoid of an axial flange, is mounted in a housing lid 16.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A sealing ring comprising:
   a bearing ring with a radial flange and sealing sleeve, the sealing sleeve including, on a side radially facing away from a shaft to be sealed, a peripherally surrounding flat covering;
   wherein at a free end of the sealing sleeve, the sealing sleeve is connected with a thickened, surrounding bulge; and
   a ratio of a height (H) of the bulge to a thickness (D) of the covering is at least 4 and/or that a ratio of the height (H) to a width (B) of the bulge (6) is in the range of 0.5 to 5.

2. The sealing ring according to claim 1, wherein the bulge comprises a polymeric material.

3. The sealing ring according to claim 1, wherein the sealing sleeve is fastened to a radial flange of the bearing ring with an intermediate layer.

4. The sealing ring according to claim 3, wherein the intermediate layer and the covering are a single unit comprised of the same material.

5. The sealing ring according to claim 1, wherein the covering is provided with ribs distributed over a periphery of the covering.

6. The sealing ring according to claim 1, wherein the covering is diffusion-resistant.

7. The sealing ring according to claim 1, wherein the covering and the bulge are a single unit and comprised of the same material.

8. The sealing ring according to claim 1, wherein the bulge is adhesively attached to the free end of the sealing sleeve.

9. The sealing ring according to claim 1, wherein the bulge has at least one lip-shaped projection extending radially inward, said projection being closed and surrounding a shaft in a sealing manner.

10. The sealing ring according to claim 9, wherein on a side radially facing the shaft, the sealing sleeve is provided with at least one back-feeding groove for back-feeding a medium to be sealed in a direction of a space to be sealed off.

11. The sealing ring according to claim 10, wherein a depth and/or a width and/or a slope of the back-feeding groove is variable along the sealing sleeve.

12. The sealing ring according to claim 9, wherein at the free end of the sealing sleeve, the projection closes the back-feeding groove in a sealing manner.

13. The sealing ring according to claim 1, wherein the bearing ring is provided with an axial flange which on a side radially facing away from a shaft is connected with a radial flange; and that a periphery of the axial flange is surrounded by a static sealing region.

14. The sealing ring according to claim 13, wherein the covering and the static sealing region comprise a polymeric material.

15. The sealing ring according to claim 13, wherein the covering and the static sealing region are made as a unit and comprise the same material.

16. The sealing ring according to claim 13, wherein the covering and the static sealing region comprise different materials.

17. The sealing ring according to claim 1, wherein the sealing sleeve comprises a PTFE compound.

18. The sealing ring according to claim 1, wherein the free end of the sealing sleeve is curved axially in the direction of a space to be sealed off.

19. The sealing ring according to claim 1, wherein the free end of the sealing sleeve is curved axially in the direction of its surroundings.

20. A housing lid comprising:
a sealing ring according to claim 1, the sealing ring being integrated into the housing lid.

* * * * *